(12) United States Patent
Batchelor (10) Patent No.: US 6,681,535 B1
(45) Date of Patent: Jan. 27, 2004

(54) MOBILE HOME TRAILER DOLLY SET

(75) Inventor: Ty Batchelor, Decatur, AL (US)

(73) Assignee: Southern Energy Homes, Double Springs, AL (US)

( * ) Notice: Subject to any disclaimer, the term of this patent is extended or adjusted under 35 U.S.C. 154(b) by 12 days.

(21) Appl. No.: 10/114,284

(22) Filed: Apr. 2, 2002

(51) Int. Cl.[7] .......................... B61D 17/12; B61D 39/00
(52) U.S. Cl. ........................................................ 52/143
(58) Field of Search ............................ 52/143; 280/402, 280/476.1, 491.1, 491.5, 495, 656, 63, 79.11

(56) References Cited

U.S. PATENT DOCUMENTS

| | | | |
|---|---|---|---|
| 3,697,098 A | * 10/1972 | Fisher | ................... 280/415 R |
| 3,944,242 A | 3/1976 | Eubank | |
| 4,065,892 A | 1/1978 | Lawrence | |
| 4,067,158 A | * 1/1978 | Lawrence | ................... 52/143 |
| 4,147,373 A | 4/1979 | Cully | |
| 4,213,624 A | 7/1980 | Sanders | |
| 4,488,735 A | * 12/1984 | Hehr | ................... 280/656 |
| 4,878,691 A | 11/1989 | Cooper et al. | |
| 5,348,333 A | * 9/1994 | Gee | ................... 280/491.5 |
| 5,855,378 A | 1/1999 | Capehart | |
| 5,921,566 A | * 7/1999 | Kern et al. | ................... 280/79.11 |

* cited by examiner

*Primary Examiner*—Carl D. Friedman
*Assistant Examiner*—Naoko Slack
(74) *Attorney, Agent, or Firm*—Smith, Gambrell & Russell (57) ABSTRACT

A mobile home transport dolly set permits the transportation of a mobile home in a lowered, or underslung condition. By reducing the transport height of the mobile home frame, valuable mobile home design height is recaptured to permit construction of a mobile home with a greater wall height and/or roof pitch. The design of the transport dolly permits the load bearing transport wheels to be repositioned from beneath the mobile home frame to a position aft of the mobile home frame. A vertical spacing frame member is affixed to the underside of the dolly and tongue frames and provides the desired drop for the mobile home frame. Coupling extensions are affixed to the vertical spacing frame member and extend forward for engagement with the aft end of the mobile home frame. Receivers may be provided on the mobile home frame to facilitate connection of the transport dolly.

17 Claims, 13 Drawing Sheets

MOBILE HOME TRAILER DOLLY SET

TECHNICAL FIELD

This invention relates generally to the field of mobile home construction and transport. More particularly the invention relates to an improved mobile home carriage assembly that provides additional vertical clearance for the transport of a finished mobile home.

BACKGROUND OF THE INVENTION

The U.S. Department of Transportation regulates the maximum highway dimensions for motor vehicles and trailers, including mobile homes. Mobile home manufacturers have been successful in compensating for width limitations by the introduction of the now familiar "double wide" construction technique. However, significant constraints are still imposed on the maximum vertical height that a mobile home can achieve. These constraints limit the sidewall height and roof pitch combinations attainable in conventional mobile home construction techniques.

Accordingly, mobile home manufactures and consumers have been forced to strike a balance between a desired wall height and roof pitch. With an increased wall height, the roof pitch must be substantially reduced. With an increased roof pitch, the wall height must be reduced accordingly. Each of these constraints combines to give mobile homes distinctive characteristics that may detract from their aesthetic appearance. These characteristics are often the subject of local zoning ordinances that may specify minimum roof pitch or wall height combinations. These ordinances often preclude owners from locating their homes in certain places within a community, or preclude them from locating their homes in a community entirely.

Some mobile home manufacturers have attempted to compensate for the limitations in vertical transport height by utilizing an expandable roof design. In the transport configuration, the mobile home roof is stowed in a collapsed condition. Upon placement at a desired home site, the roof is elevated and secured in its expanded condition. While this technique has enjoyed some success, the expandable roof design tends to experience integrity problems with substantially greater frequency than traditional fixed roof designs.

While the industry has attempted to change the mobile home construction techniques to compensate for vertical clearance limitations, it has generally failed to address the constraints imposed by conventional transport methods employed in the mobile home industry. While conventional transport carriages may vary in the types, number, and placement of the axles, such carriages continue to be placed underneath the mobile home frame. By utilizing an under carriage configuration, the mobile home transported on such a carriage must sacrifice vertical height to maintain sufficient highway clearance.

Accordingly, there is a need in the mobile home industry for a transport method that permits an increase in mobile home wall height or roof pitch while maintaining sufficient highway clearance during transport of the mobile home to a desired location.

BRIEF SUMMARY OF THE INVENTION

The present invention addresses the problems identified above and offers other operational and economic advantages over conventional mobile home carriage assemblies. The present invention includes a transport dolly and tongue assembly that permits a finished mobile home to be transported in an underslung condition, thereby recapturing vertical clearance lost due to conventional under carriage transport systems.

The mobile home transport dolly includes an upper frame that provides the structural support for the dolly and attachment points for suspension of the load bearing transport wheels. A vertical spacing frame is attached to a forward end of the upper frame and provides the desired vertical drop for the mobile home. Coupling extensions are attached to the spacing frame and project forwardly therefrom. The coupling extensions are attached to the lower frame members of the mobile home and may be secured thereto by attachment means, such as bolts or pins. By this arrangement, the dolly wheels are moved from a position beneath the mobile home frame to a position above and behind the mobile home frame. The repositioning of the dolly wheels from beneath the mobile home frame permits the aft end of the mobile home to be lowered significantly from its conventional transport height.

The mobile home transport tongue assembly is a modified version of conventional mobile home tongue assembly that permits lowering of the front end of the mobile home commensurate with that provided by the transport dolly. The modified tongue assembly permits the mobile home to be supported by tongue extensions substantially lower than conventional tongue assemblies do. The tongue assembly of the present invention substantially shortens the tongue extensions of the conventional mobile home tongue assembly. Rather than being placed underneath the mobile home, the shortened tongue extensions are positioned in abutment with the front face of the mobile home frame. In place of the standard tongue extensions, coupling support extensions are attached to the under side of the modified conventional tongue and extend rearward therefrom. The coupling support extensions are provided attachment pads that correspond with those of the conventional tongue assembly. By this modification, the front end of the mobile home may be lowered by an amount commensurate with the height of the conventional mobile home tongue assembly. By selecting taller spacing frame members, additional clearance may be achieved.

As with conventional tongue assemblies, the tongue assembly of the present invention is removable upon placement of the mobile home at the desired location. While the conventional carriage assemblies may also be removed from the mobile home, they are frequently left in place on the mobile home. This may be partially explained by the desire to have wheels in place for an anticipated or unanticipated move. However, more frequently, the decision to leave the carriage assemblies in place stems from the difficulty of removing the assemblies, combined with the difficulty of transporting the carriages once they are removed from the mobile home. In that regard, the present invention solves both of these problems. First, the transport dolly is readily detachable from the mobile home frame. Second, the transport dolly may be attached to the tongue assembly and readily towed back to the mobile home manufacturing facility or sales lot.

BRIEF DESCRIPTION OF THE DRAWINGS

Various embodiments of my invention are depicted in the appended drawings which form a part of this disclosure and wherein.

DETAILED DESCRIPTION OF THE INVENTION

Figure 1:
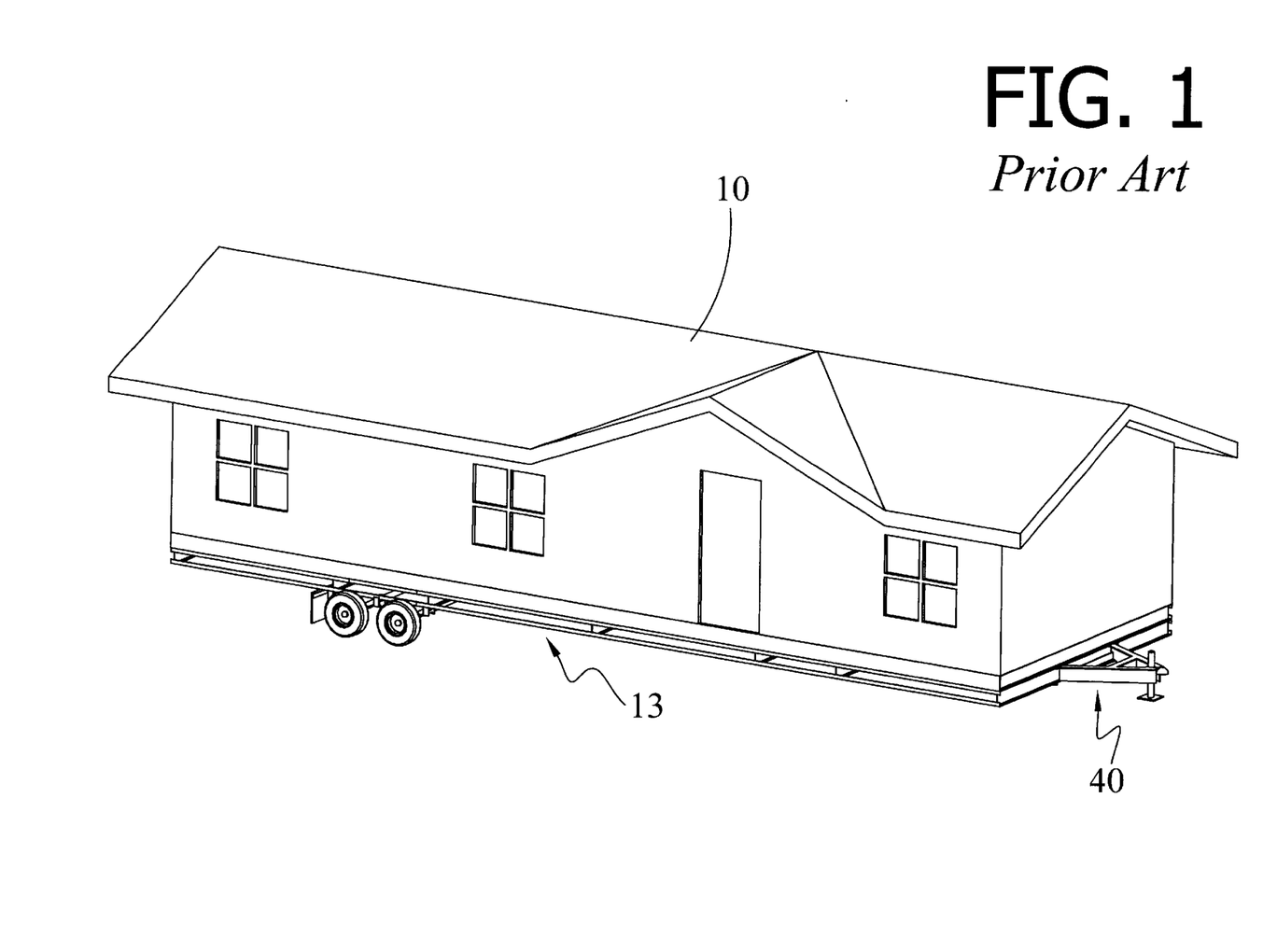
FIG. 1 depicts is a side view of a conventional mobile home transport carriage and tongue assembly.
Figure 9:
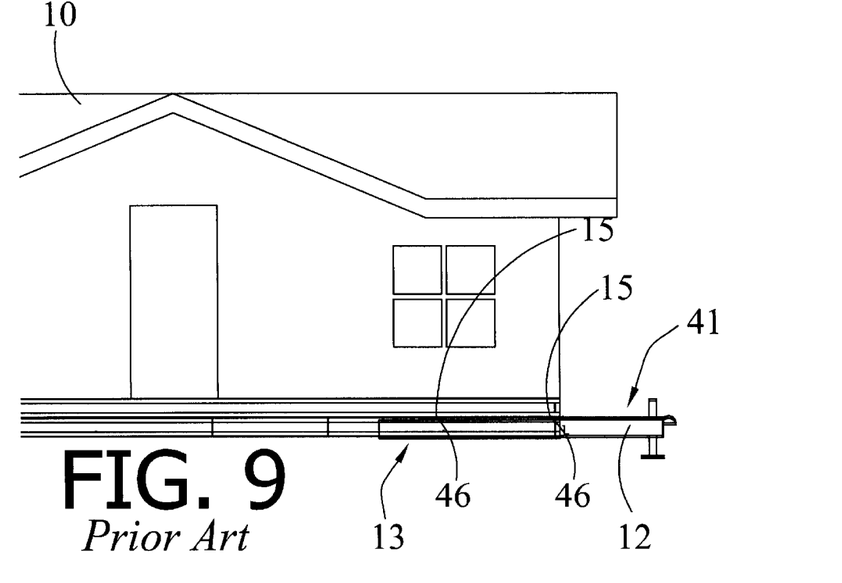
FIG. 9 depicts a close up side view of a mobile home on a conventional tongue assembly.
Figure 11:
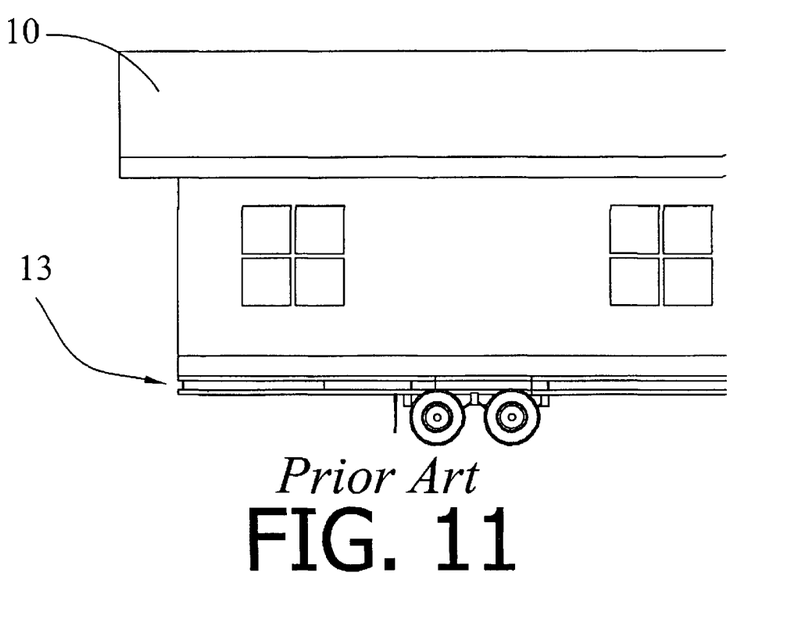
FIG. 11 depicts a close up side view of a mobile home on a conventional under carriage assembly.
Figure 12:
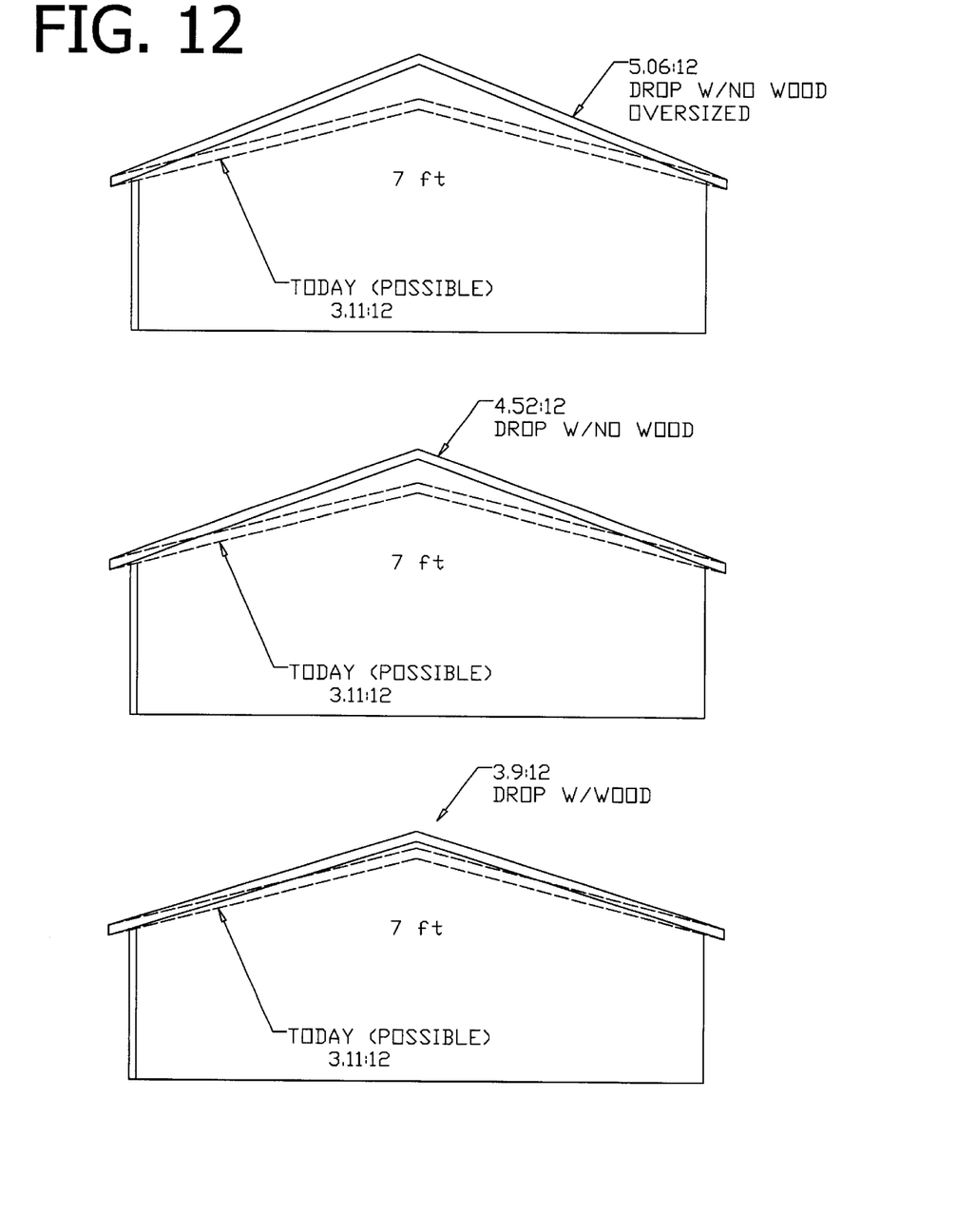
FIG. 12 depicts the prior art roof pitch compared to roof pitches attainable on a mobile home with a 7 foot wall height and transported using the transport dolly and tongue assembly of the present invention.
Figure 13:
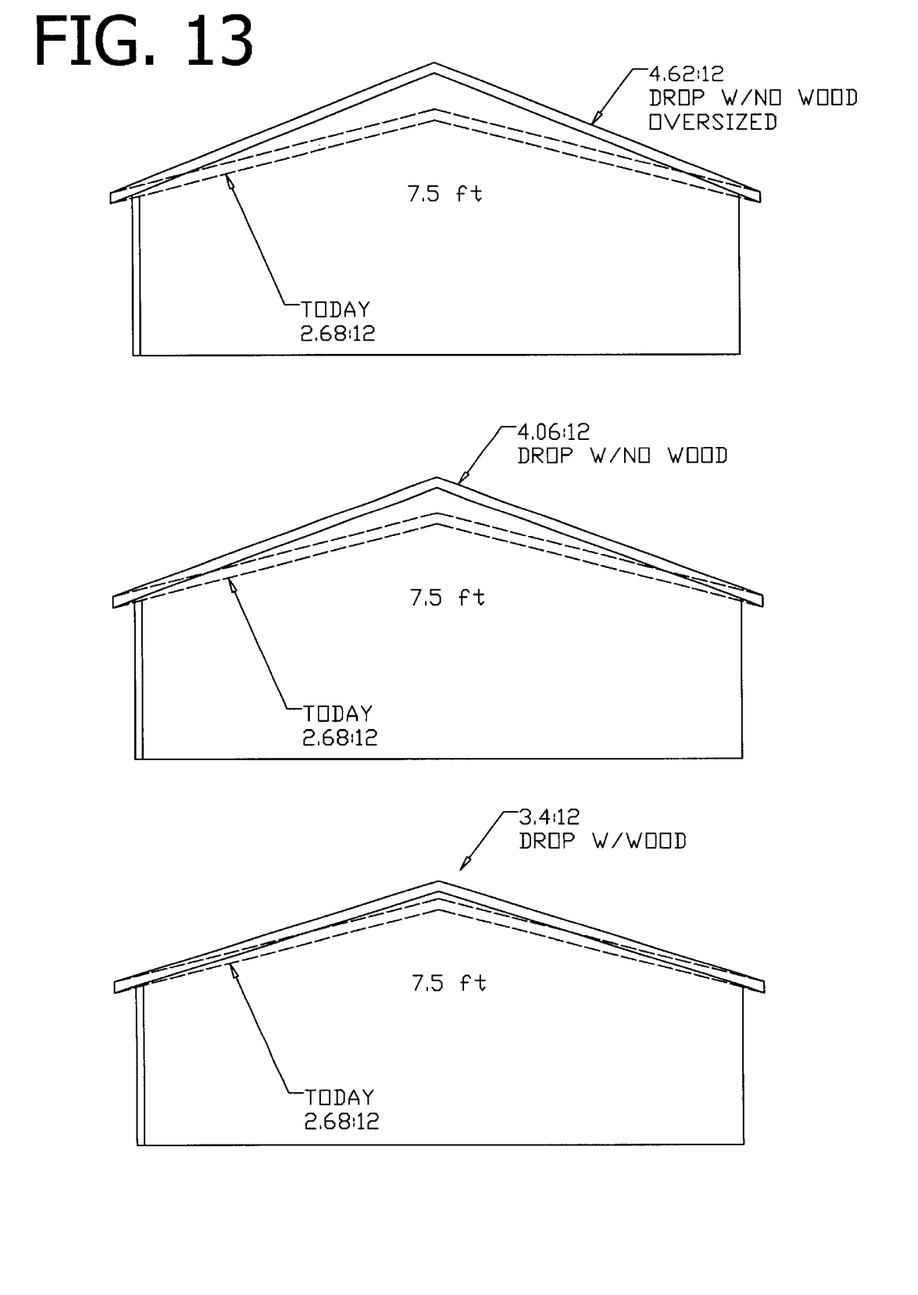
FIG. 13 depicts the prior art roof pitch compared to roof pitches attainable on a mobile home with a 7½ foot wall height and transported using the transport dolly and tongue assembly of the present invention.
Figure 14:
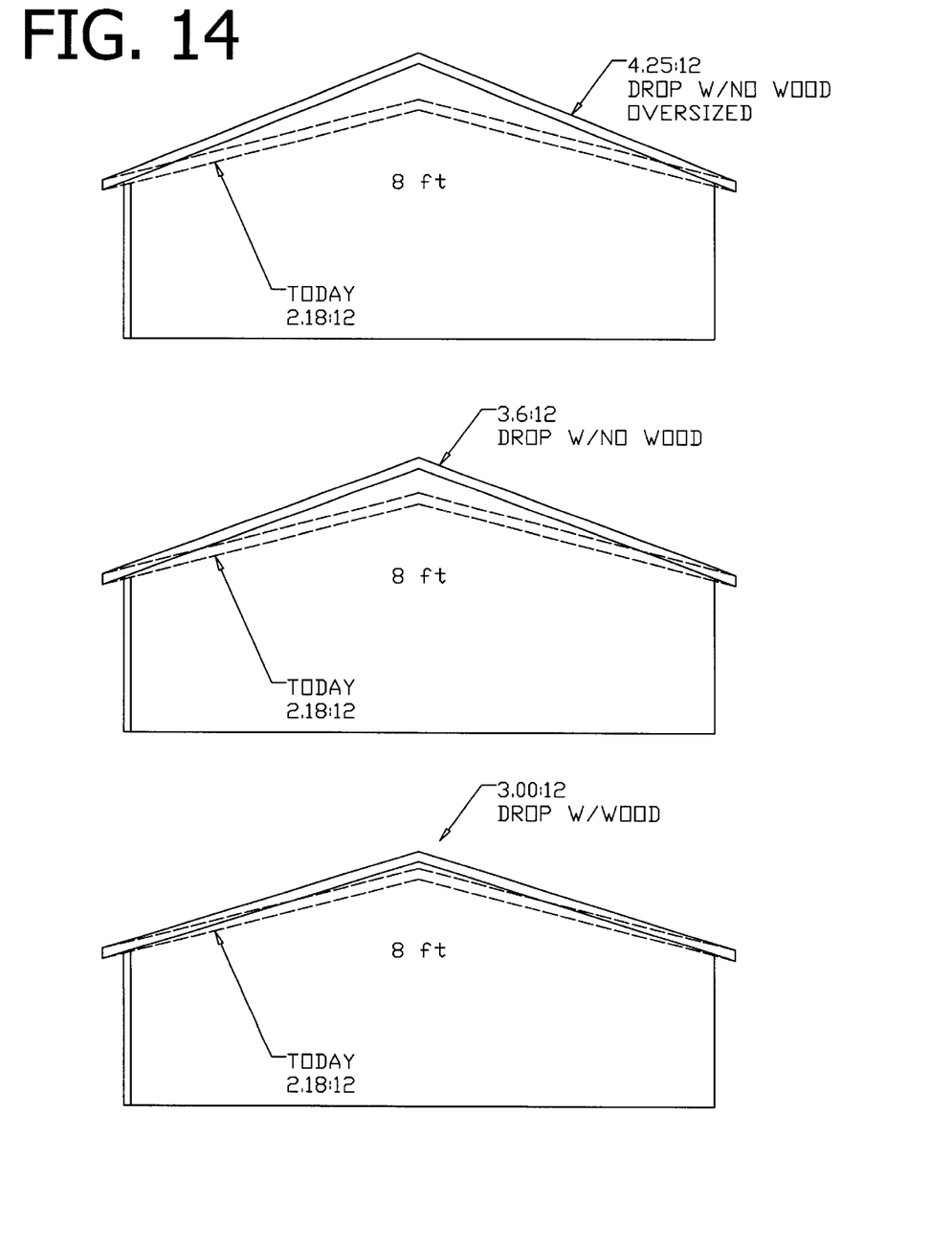
FIG. 14 depicts the prior art roof pitch compared to roof pitches attainable on a mobile home with an 8 foot wall height and transported using the transport dolly and tongue assembly of the present invention.
Figure 15:
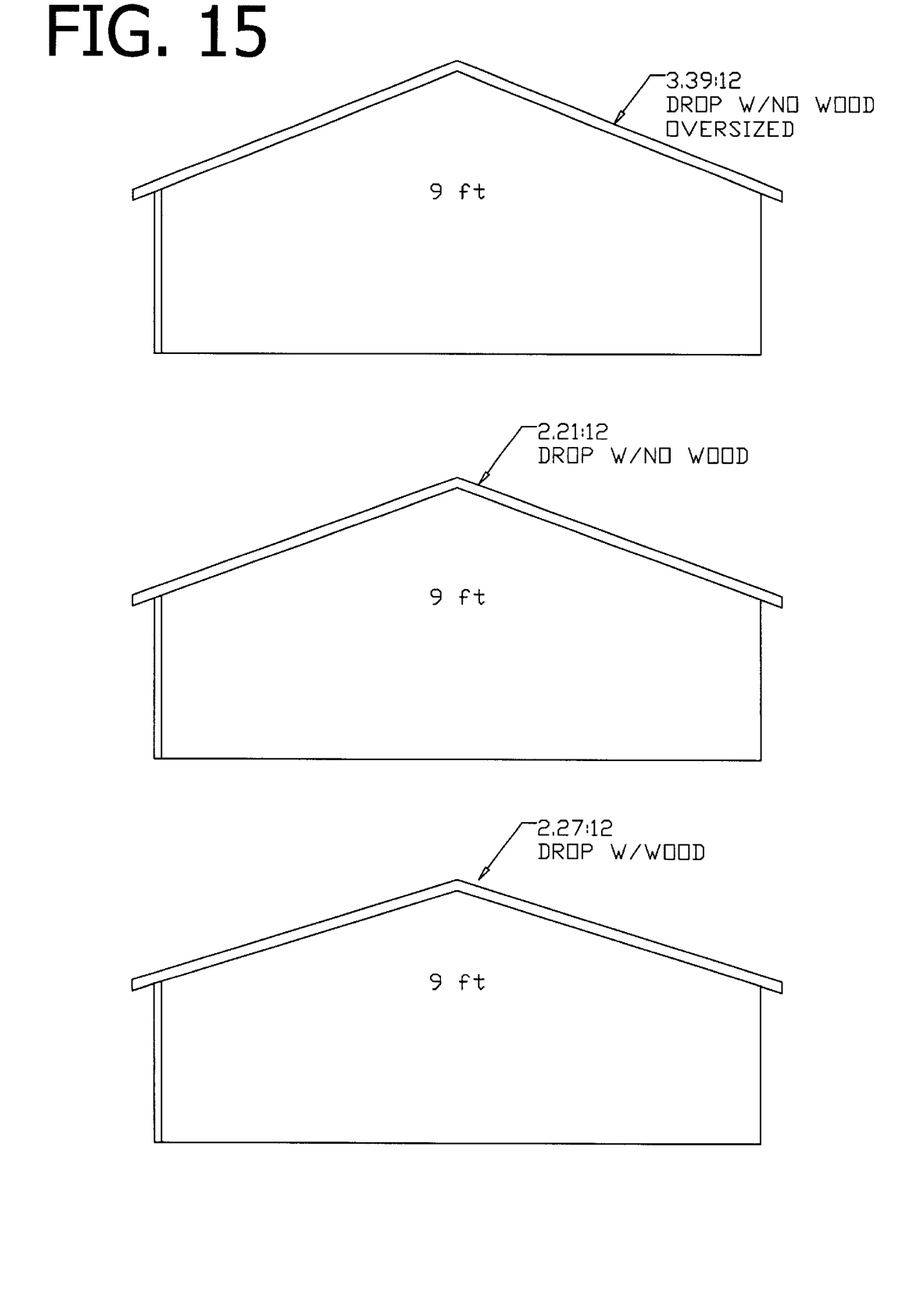
FIG. 15 depicts the roof pitches attainable on a mobile home with a 9 foot wall height and transported using the transport dolly and tongue assembly of the present invention.

By reference to FIGS. 1, 9, and 11, a mobile home 10 may be seen on a conventional carriage assembly 11 drawn by a conventional tongue assembly 12. As described above, the transport height of a mobile home is a significant constraint on the design height of the mobile home. By the positioning of the conventional carriage assembly 11 and tongue assembly 12 beneath the mobile home frame 13 the prior art transport method sacrifices valuable design height.

Figure 2:
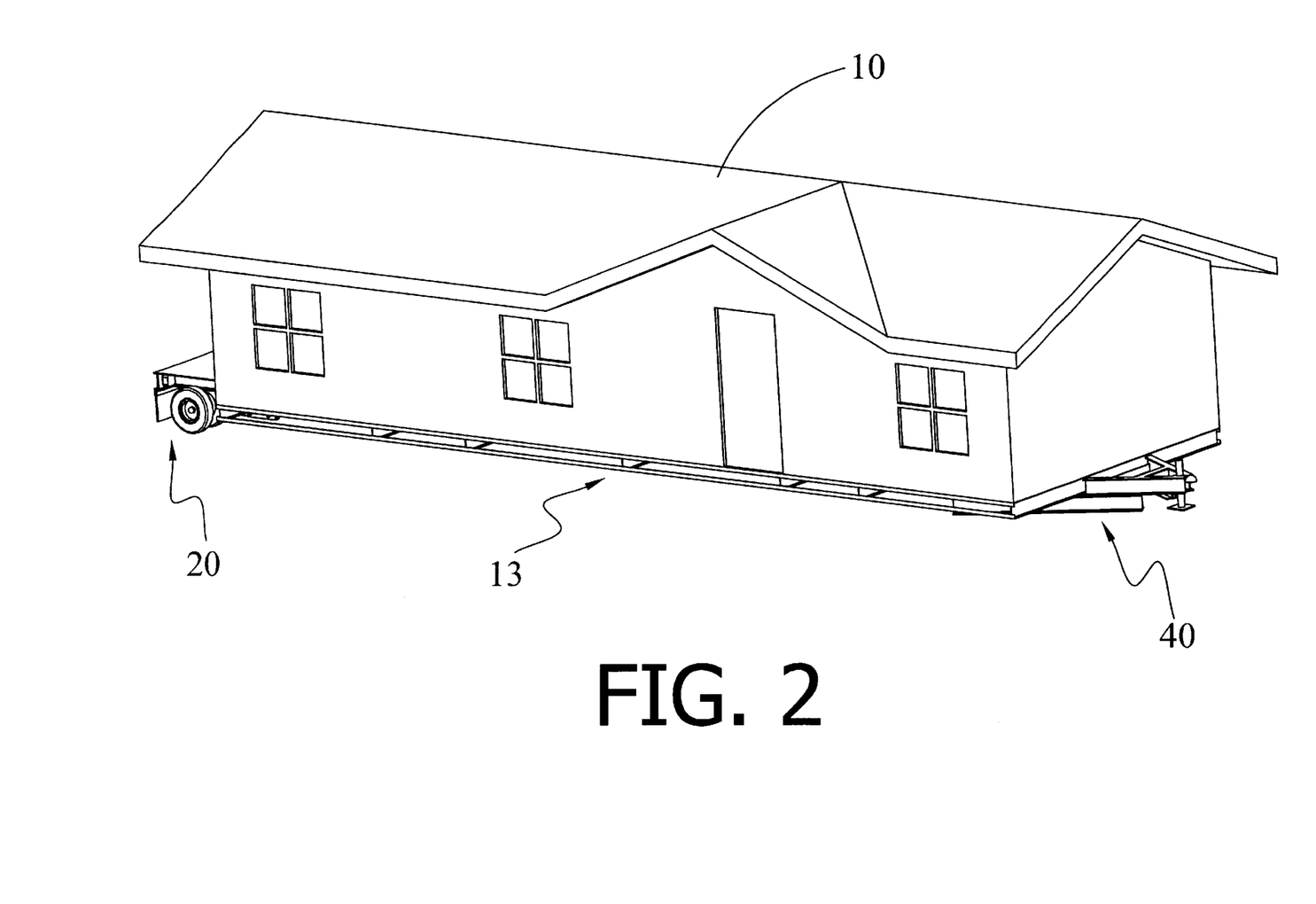
FIG. 2 depicts a perspective view of a mobile home in a transport configuration on the mobile home transport dolly and tongue assembly of the present invention.
Figure 8:
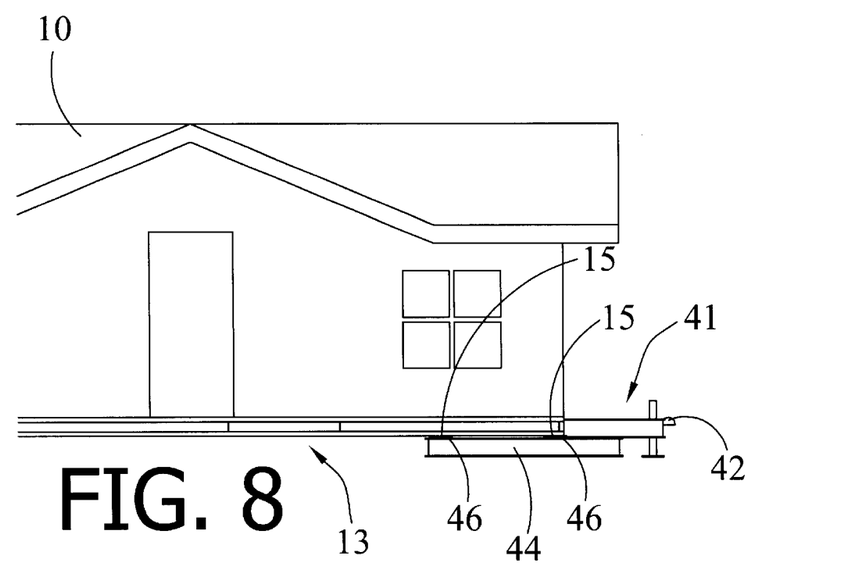
FIG. 8 depicts a close up side view of a mobile home on the transport tongue assembly of the present invention.
Figure 10:
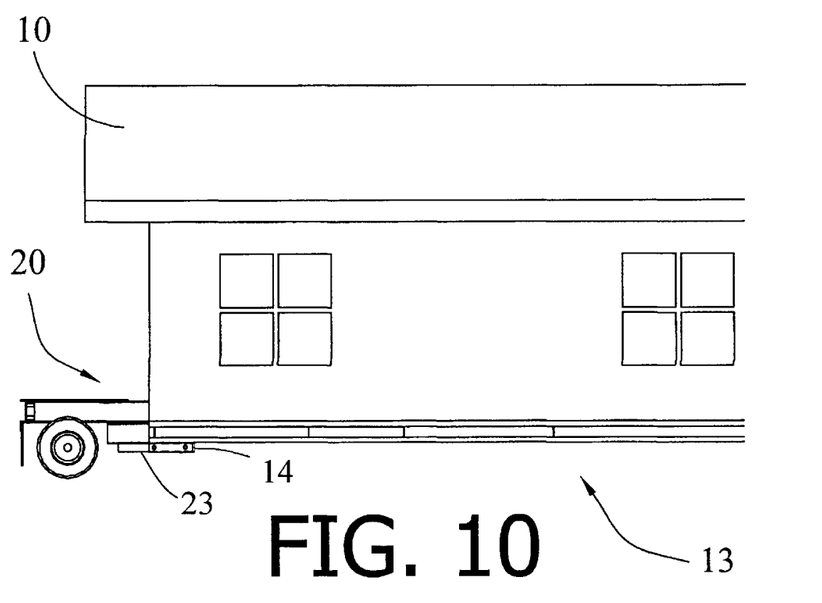
FIG. 10 depicts a close up side view of a mobile home on the transport dolly of the present invention.

Referring to FIGS. 2, 8, and 10, a mobile home 10 is seen on the transport dolly 20 and tongue assembly 40 of the present invention. From these drawings it can be readily seen that mobile home 10 is carried in a lowered or underslung condition between transport dolly 20 and tongue assembly 40. This underslung condition permits the mobile home manufacturer and designer to recapture valuable design height lost by the prior art transport methods. By recapturing this valuable design height, mobile home manufacturers and designers can create improved mobile home designs previously unobtainable, and further described herein.

Figure 3:
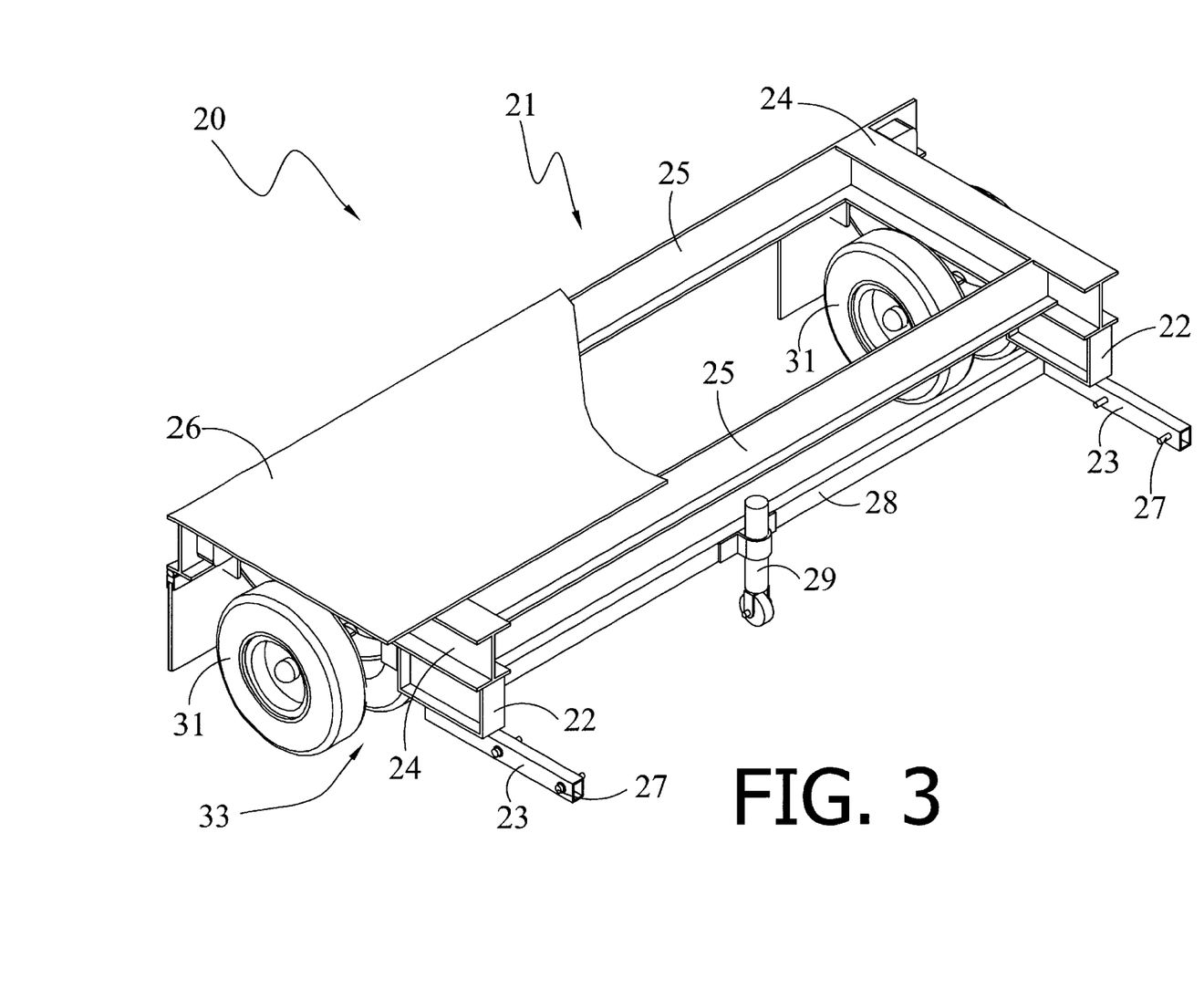
FIG. 3 depicts a perspective view of the mobile home transport dolly with a dual wheel independent suspension.
Figure 4:
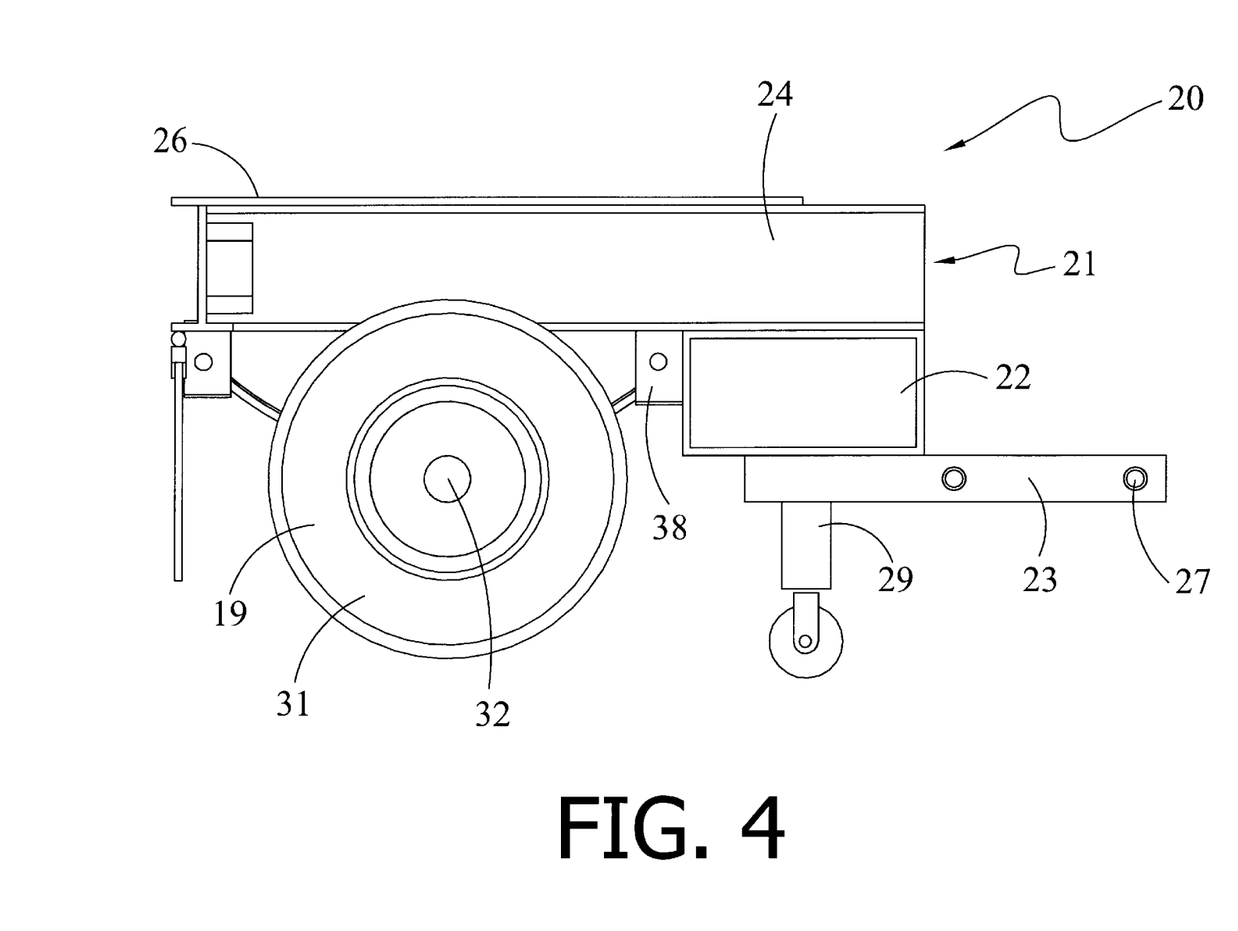
FIG. 4 depicts a side view of a mobile home transport dolly.
Figure 5:
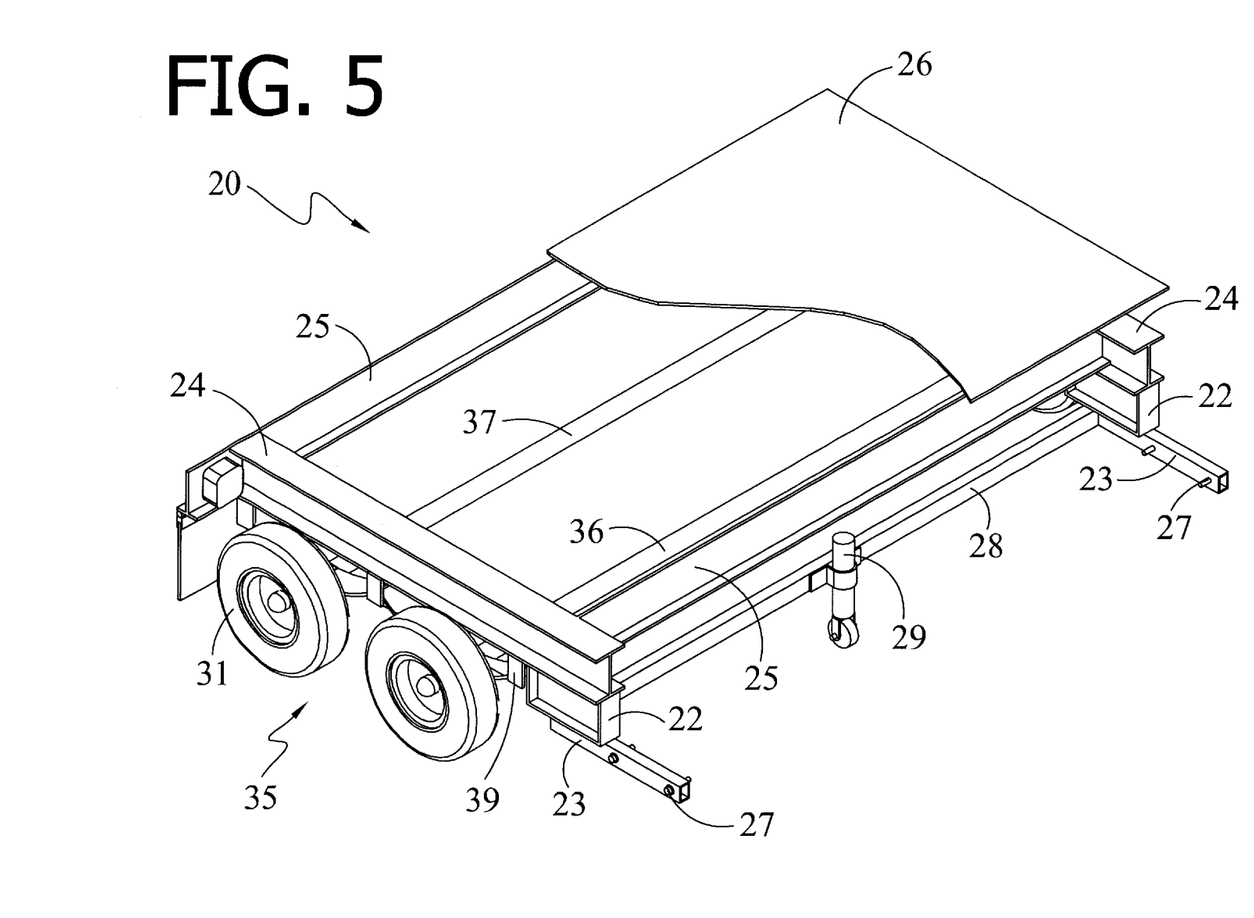
FIG. 5 depicts a perspective view of the mobile home transport dolly with a tandem axle suspension.

Various embodiments of the mobile home transport dolly 20 may be seen by reference to FIGS. 3–5. For clarity, corresponding structures between the various embodiments are identified with the same reference numbers. The mobile home transport dolly 20 comprises an upper frame 21, a plurality of spaced apart load bearing transport wheels 31 disposed in suspension from a lower aft end of upper frame 21, at least one vertical spacing frame member 22 affixed beneath a forward end upper frame 21, and a plurality of coupling extensions 23 affixed to vertical spacing frame member 22, spaced apart, and extending forwardly therefrom. Coupling extensions 23 are adapted for connection with lower support frame 13 of a mobile home 10 transported by dolly 20.

Upper frame 21 is comprised of a plurality of spaced apart longitudinal beams 24, preferably disposed parallel one another. At least one transverse beam 25, disposed between longitudinal beams 24 and joined thereto, completes upper frame 21. Upper frame 21 may be covered by a plate 26 to protect mobile home 10 from damage caused by highway debris displaced by wheels 31. The length of longitudinal beams 24 extending forward of the axis of wheel rotation 32 should be kept to a minimum to avoid excessive loading of longitudinal beams 24 and to minimize effects upon turn radius.

A plurality of load bearing transport wheels 31 are disposed in suspension from a lower aft end of upper frame 21. Wheels 31 are generally disposed in opposed pairs as is customary in road vehicles. In the preferred embodiment, depicted in FIG. 3, load bearing transport wheels 31 are independently suspended in a dual wheel 33 arrangement. The weight of a full sized mobile home will normally preclude single wheel independent suspension systems. However, smaller mobile homes may permit use of a single wheel independent suspension embodiment. The dual wheel independent suspension 33 was found preferable over the tandem axle 35 configuration depicted in FIG. 5 since forward axle 36 of the tandem axle configuration tends to bear the majority of the transported load, while rear axle 37 carries only a minimal load. As with the independent suspension configuration, a single axle configuration may be appropriate to transport a smaller mobile home 10.

As stated above, vertical spacing frame member 22 is affixed beneath the forward ends of upper frame 21. A single vertical spacing frame member 22 may be attached transverse to longitudinal beams 24, but the preferred embodiment contemplates that a plurality of vertical spacing members 22 be affixed lengthwise beneath longitudinal beams 24. As shown in the drawings, vertical spacing members 22 may extend from a point forward of suspension attachment points 38 and should terminate with the forward end of longitudinal beams 24, as extension beyond this point will introduce additional loads to each component.

The height of vertical spacing members 22 is selected to obtain a desired vertical drop in the mobile home transport height. However, the vertical drop is limited by the length of the transported mobile home 10 and the presence of road surface irregularities. Caution must be exercised in selecting a vertical drop since adequate road bed clearance must be maintained to avoid contact between mobile home lower frame 13 and the road surface. The influence of road surface irregularities is more pronounced as mobile home length is increased.

At least two coupling extensions 23 are affixed to vertical spacing frame member 22, spaced apart, and extending forwardly therefrom. In situations where greater lateral support of mobile home frame 13 is required, additional coupling extensions 23 may be appropriate. Coupling extensions 23 are adapted for connection with lower support frame 13 of mobile home 10. Typically, coupling extensions 23 are attached via attachment means 27, such as nuts and bolts, to lower support frame 13. It may be desirable to provide lower support frame 13 with receivers 14 corresponding to each coupling extension 23. Attachment of dolly 20 to mobile home support frame 13 may then be made via pins in lieu of the nut and bolt combination discussed earlier. For improved structural support a transverse support member 28 may be provided between coupling extensions 23. Attachment of transverse support member 28 should be made at a point behind the forward end of vertical spacing member 22 to avoid interfering with the interface between coupling extension 23 and mobile home support frame 13. To assist in maneuvering the transport dolly 20, for coupling engagement with mobile home frame 13, a trailer jack 29 may be attached to transverse support member 28.

Figure 6:
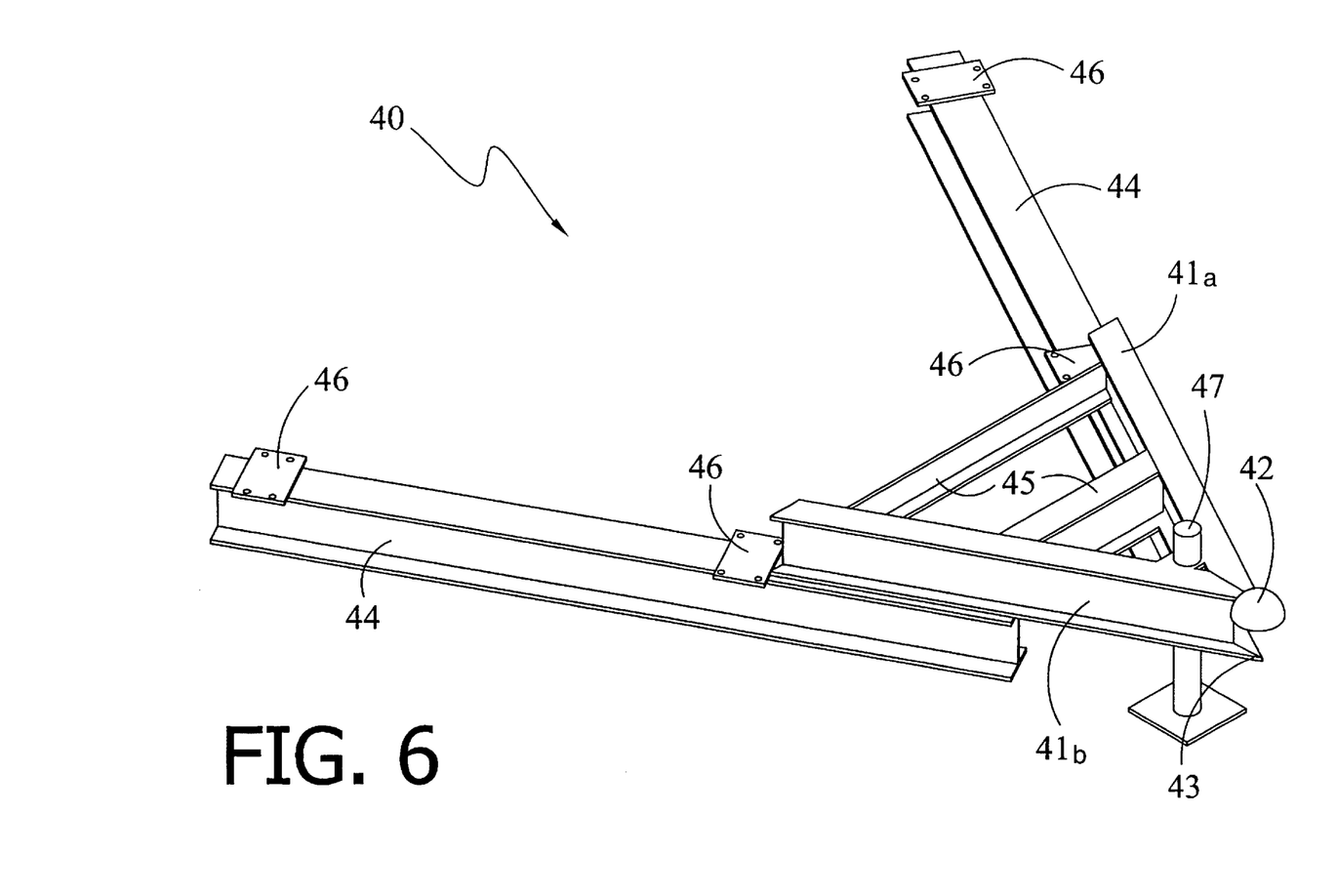
FIG. 6 depicts a perspective view of the mobile home transport tongue assembly.
Figure 7:
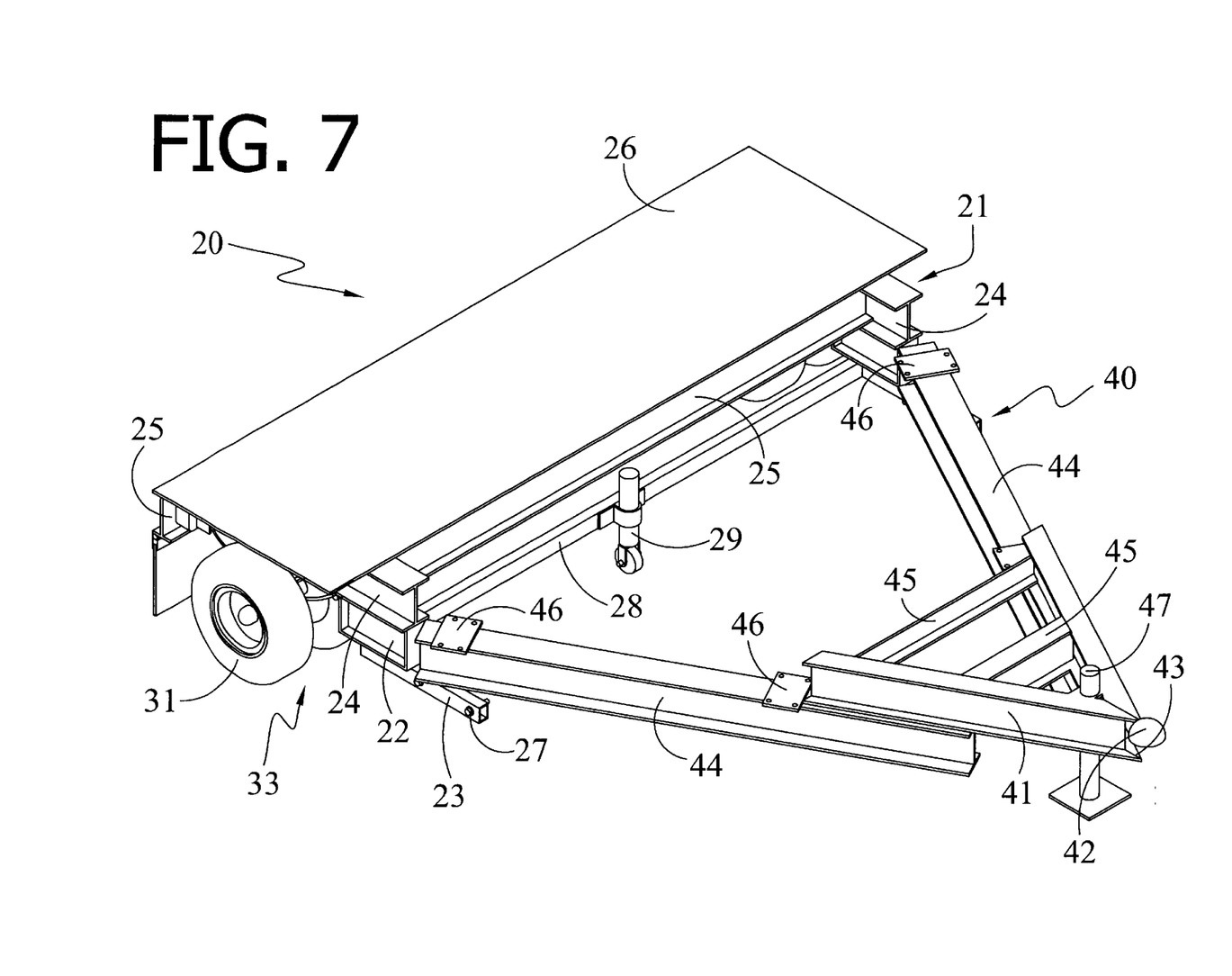
FIG. 7 depicts a perspective view of the mobile home transport dolly and transport tongue assembly.

As depicted in FIGS. 6, 7, 8, a transport tongue assembly 40 is provided to permit lowering the forward end of mobile home 10. As may be apparent, transport tongue assembly 40 is a modified conventional tongue assembly 12. Transport tongue assembly 40 is comprised of a substantially V-shaped vertical spacing frame 41, having legs 41a, 41b, and a hitch assembly 42 attached to the forward apex 43 thereof. Hitch assembly 42 is adapted to be coupled with a draw point on a towing vehicle (not shown), the type of hitch and draw point are not critical to practicing the invention disclosed herein. A plurality of coupling support members 44 are attached to a lower end of vertical spacing frame 41 and extend rearward from apex 43. Coupling support members 44 are adapted to be attached to the forward end of mobile home lower support frame 13. Transverse support beams 45, disposed between leg 41a and 41b, may be provided for additional structural support.

The height of V-shaped vertical spacing frame 41 should be selected to obtain a desired vertical drop in the mobile home transport height and should correspond with the drop provided by transport dolly 20 so that mobile home 10 is substantially level between its fore and aft ends. As with transport dolly 20, the vertical drop is limited by the length of the transported mobile home 10 and the presence of road surface irregularities. Caution must be exercised in selecting a vertical drop since adequate road bed clearance must be maintained to avoid contact between mobile home lower frame 13 and the road surface. The impact of road surface irregularities is more pronounced as mobile home length is increased.

To avoid design changes in mobile home support frame 13, coupling support members 44 are provided with tongue coupling pads 46 attached to an upper surface thereof and positioned to correspond with tongue receiving pads 15 in mobile home support frame 13. As with conventional mobile home transport tongue assemblies 12, transport tongue assembly 40 of the present invention may be detached from mobile home 10 when not required for transport. In like fashion, transport tongue assembly 40 may be provided with a trailer jack 47 to assist in coupling hitch assembly 42 to a towing vehicle or to assist in leveling mobile home 10 at a desired location.

After mobile home 10 has been delivered to a desired location, transport dolly 20 and transport tongue 40 assemblies are readily detached from mobile home 10. In addition to the above-described features, transport tongue assembly 40 and transport dolly 20 are adapted to be interconnected with each other. As shown in FIG. 7, the interconnected components of the transport dolly 20 and tongue assembly 40 permits recovery of the transport set by the delivery vehicle or even a substantially smaller tow vehicle.

By practicing the above-described invention, a mobile home manufacturer may recover at least about 12 inches of mobile home design height. The recovery of this design height permits the construction of mobile homes heretofore unobtainable with conventional mobile home transport designs, as is more fully described in the following.

The drawings of FIGS. 12–15 illustrate the various mobile home designs attainable by utilizing the improved mobile home transport system described above. Each drawing depicts the roof pitches attainable for various wall heights with the recovery of 9 inches of transport height. The dashed lines in the figures illustrate the roof pitches presently available in the industry. The solid lines indicate the roof pitches attainable by utilizing the improved mobile home transport system.

In the mobile home construction industry, it is common practice for a mobile home to be built upon wood floor joists attached to the steel lower frame. Homes constructed according to this practice are illustrated in the bottom sketches of FIGS. 12–15 as "w/wood." The drawings are summarized in Table 1.

TABLE 1

Improvement of Roof Pitch: Wood Floor Joist

| Sidewall Height | Standard Roof Pitch | Pitch W/ Wood | % Increase |
|---|---|---|---|
| 9 | NA | 2.13:12 | — |
| 8 | 2.18:12 | 3.00:12 | 37 |
| 7 1/2 | 2.68:12 | 3.40:12 | 29 |
| 7 | 3.11:12 | 3.90:12 | 26 |

Another common practice in mobile home construction is to build directly on the steel lower frame. This method recaptures the vertical height used by the wood floor joists. Homes constructed according to this practice are illustrated in middle sketches of FIGS. 12–15 as "w/no wood," the results of which are summarized in Table 2.

TABLE 2

Improvement of Roof Pitch: No Wood Floor Joist

| Sidewall Height | Standard Roof Pitch | No Wood Roof Pitch | % Increase |
|---|---|---|---|
| 9 | NA | 2.73:12 | — |
| 8 | 2.18:12 | 3.6:12 | 65 |
| 7 1/2 | 2.68:12 | 4.06:12 | 51 |
| 7 | 3.11:12 | 4.52:12 | 45 |

Mobile homes may also be manufactured in anticipation of obtaining an oversized shipping permit from the Department of Transportation. Mobile homes constructed according to this practice are indicated in the top sketches of FIGS. 12–15 as "Over-sized Shipping." The results obtainable for over-sized mobile homes are summarized in Table 3.

TABLE 3

Improvement of Roof Pitch: Over-sized Shipping

| Sidewall Height | Standard Roof Pitch | No Wood Roof Pitch | % Increase |
|---|---|---|---|
| 9 | NA | 3.39:12 | — |
| 8 | 2.18:12 | 4.25:12 | 94 |
| 7 1/2 | 2.68:12 | 4.62:12 | 72 |
| 7 | 3.11:12 | 5.06:12 | 66 |

As can be seen by reference to FIGS. 12–15 and the summarized data above, the mobile home transport set of the present invention provides a substantial improvement in roof pitches attainable by mobile home manufactures resulting from recapture of valuable mobile design height. The most significant improvements are provided in the 8 foot wall homes. Moreover, due to the capability provided by the mobile home transport dolly set construction of mobile homes with 9 foot sidewalls may now be achieved. Finally, a mobile home roof pitch of at least 5:12 may now be achieved.

It should be understood that although I have described my invention in some detail, modifications and variations might be made without departing from the spirit of my invention. Accordingly, I claim as my invention all forms thereof coming within the scope of the appended claims.

What I claim is:

1. A mobile home transport dolly for connection with a lower support frame of a mobile home transported by said transport dolly, said transport dolly comprising an upper frame, a plurality of spaced apart load bearing transport wheels attached by a suspension system affixed to a lower aft end of said upper frame, at least one vertical spacing frame member affixed beneath a forward end of said upper frame, and a plurality of spaced apart coupling extensions affixed to said at least one vertical spacing frame member and extending forwardly therefrom, and attachment means securing said coupling extensions to an aft end of said mobile home lower support frame.

2. The mobile home transport dolly as in claim 1, wherein said upper frame member comprises a plurality of longitudinal beams, spaced apart, and joined by at least one transverse beam.

3. The mobile home transport dolly as in claim 2, wherein one said vertical spacing frame member is affixed beneath a forward portion of each said longitudinal beam.

4. The mobile home transport dolly as in claim 3, wherein said vertical spacing frame member has a height corresponding to a desired vertical displacement of said mobile home transported by said dolly.

5. The mobile home transport dolly as in claim 1, wherein said coupling extensions are adapted to be accepted in a corresponding receiver affixed to said mobile home lower support frame.

6. The mobile home transport dolly as in claim 1, further comprising a transverse support member disposed between said coupling extensions and attached at points on said coupling extensions selected to avoid interference with said coupling extension's connection with said mobile home lower support frame.

7. The mobile home transport dolly as in claim 6, wherein a wheeled trailer jack is affixed to said transverse support member to assist in positioning said transport dolly and engaging the same with said mobile home lower support frame.

8. The mobile home transport dolly as in claim 1, wherein said suspension system comprises at least one axle affixed transverse said upper frame.

9. The mobile home transport dolly as in claim 1, wherein said load bearing transport wheels are disposed in independent suspension, beneath opposed lateral sides of said upper frame member.

10. The mobile home transport dolly as in claim 9, wherein said load bearing transport wheels are dually independently suspended.

11. A mobile home transport tongue assembly to interconnect a lower support frame of a mobile home drawn by said transport tongue assembly with a draw point on a towing vehicle, said transport tongue assembly comprising: a substantially V-shaped vertical spacing frame, a hitch assembly attached to a forward apex thereof and adapted to couple said hitch assembly with said draw point, a plurality of coupling support members attached to a lower end of said vertical spacing frame, said coupling support members extending rearward of legs of said V-shaped vertical spacing frame, said coupling support members supporting said mobile home lower support frame and attached thereto by attachment means.

12. The mobile home transport tongue assembly of claim 11, wherein said V-shaped vertical spacing frame further comprises at least one transverse support beam disposed between said legs of said V-shaped vertical spacing frame.

13. The mobile home transport tongue assembly of claim 11, wherein said V-shaped vertical spacing frame has a height corresponding to a desired vertical displacement of said mobile home drawn by said tongue assembly.

14. The mobile home transport tongue assembly of claim 11, wherein said transport tongue assembly further comprises a plurality of coupling pads affixed to an upper surface of said coupling support members, said coupling pads disposed to align with corresponding tongue receiving pads affixed beneath said lower support frame, and attachment means for securing said coupling pads to said receiving pads.

15. The mobile home transport tongue assembly of claim 11, said transport tongue assembly further comprising a trailer jack affixed to said V-shaped vertical spacing frame.

16. A mobile home transport dolly set adapted for connection with a lower support frame of a mobile home transported by said transport dolly set and adapted to be coupled with a draw point on a towing vehicle, said transport dolly set comprising: a transport dolly assembly and a transport tongue assembly;

said transport dolly assembly comprising an upper frame, a plurality of spaced apart load bearing transport wheels attached by a suspension system affixed to a lower aft end of said upper frame, at least one vertical spacing frame member affixed to a forward end of said upper frame, and a plurality of spaced apart coupling extensions affixed to said at least one vertical spacing frame member extending forwardly therefrom, attachment means securing said coupling extensions to an aft end of said mobile home lower support frame; and said transport tongue assembly comprising a substantially V-shaped vertical spacing frame, a hitch assembly attached to a forward apex thereof and adapted to couple said hitch assembly with said draw point, a plurality of coupling support members attached to a lower end of said vertical spacing frame, said coupling support members extending rearward of legs of said V-shaped vertical spacing frame, said support members supporting said mobile home lower support frame and attached thereto by attachment means.

17. The mobile home transport dolly set of claim 16, wherein said transport dolly assembly and said transport tongue assembly are adapted to be interconnected such that said mobile home transport dolly set may be transported independently of said mobile home.

* * * * *